US008433248B2

(12) United States Patent
Sreerama et al.

(10) Patent No.: US 8,433,248 B2
(45) Date of Patent: Apr. 30, 2013

(54) DYNAMIC RFI DETECTION USING SIGNAL STRENGTH VALUES

(75) Inventors: Chaitanya Sreerama, Hillsboro, OR (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 807 days.

(21) Appl. No.: 12/480,092

(22) Filed: Jun. 8, 2009

(65) Prior Publication Data

US 2010/0311374 A1    Dec. 9, 2010

(51) Int. Cl.
*H04B 1/00* (2006.01)
*H04B 15/00* (2006.01)
*H04B 17/00* (2006.01)

(52) U.S. Cl.
USPC ...................................... 455/63.1; 455/67.13

(58) Field of Classification Search ................. 455/63.1, 455/67.11, 67.13, 501
See application file for complete search history.

(56) References Cited

U.S. PATENT DOCUMENTS

| 7,733,981 | B2 * | 6/2010 | Shi et al. ........................ 375/316 |
| 7,949,435 | B2 * | 5/2011 | Pollack et al. ................. 700/291 |
| 8,155,097 | B2 * | 4/2012 | Leung et al. ................... 370/342 |
| 2003/0125019 | A1 * | 7/2003 | Bajikar ........................ 455/420 |
| 2008/0045175 | A1 * | 2/2008 | Yoon et al. ................. 455/188.1 |
| 2008/0119140 | A1 * | 5/2008 | Maligeorgos et al. ..... 455/67.13 |
| 2009/0069043 | A1 * | 3/2009 | Roh et al. ....................... 455/522 |
| 2009/0316591 | A1 * | 12/2009 | Reial et al. ..................... 370/252 |
| 2009/0325530 | A1 | 12/2009 | Sreerama |

* cited by examiner

*Primary Examiner* — Nguyen Vo
(74) *Attorney, Agent, or Firm* — Jordan IP Law, LLC

(57) ABSTRACT

An apparatus may include a radio interface to receive a plurality of signal strength values of a radio. An interference module can identify a radio frequency interference impact on the radio based on the plurality of signal strength values. In one embodiment, the radio interface issues a plurality of interference calls to the radio, where each of the plurality of signal strength values corresponds to an interference call.

17 Claims, 2 Drawing Sheets

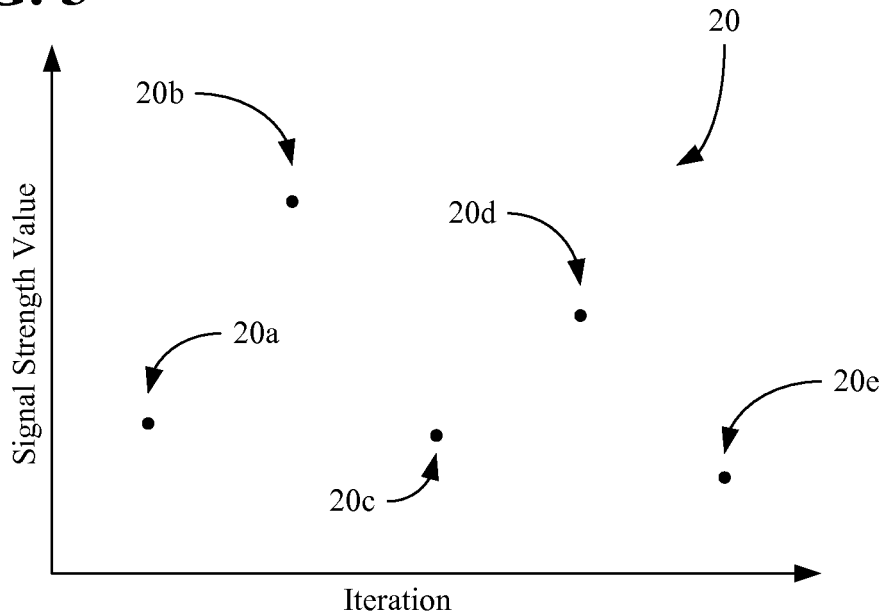
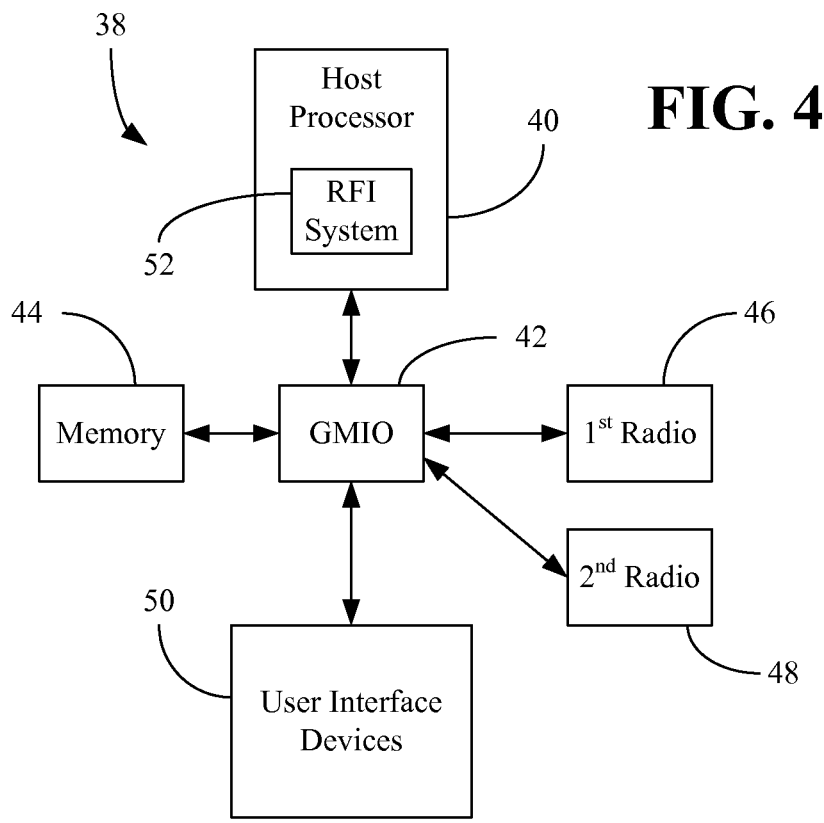

DYNAMIC RFI DETECTION USING SIGNAL STRENGTH VALUES

CROSS-REFERENCE TO RELATED APPLICATIONS

This application is related to U.S. application Ser. No. 12/217,099, filed on Jun. 30, 2008.

BACKGROUND

1. Technical Field

Embodiments of the invention generally relate to radio frequency interference (RFI). In particular, embodiments relate to the use of signal strength values to detect RFI.

2. Discussion

As mobile platforms such as laptops, personal digital assistants (PDAs) and wireless "smart phones" continue to increase in complexity, it is not uncommon for a single device to be equipped with multiple radios. The radio frequency interference (RFI) that can occur between the platform and the radios, as well as between the radios themselves, may be significant. While certain closed-loop and open-loop approaches to detecting and mitigating RFI may be available, there still remains considerable room for improvement.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a plot of an example of a plurality of signal strength values according to an embodiment of the present invention; and FIG. 4 is a block diagram of an example of a system according to an embodiment of the present invention.

DETAILED DESCRIPTION

Embodiments of the present invention provide for an apparatus having a radio interface to receive a plurality of signal strength values of a radio, and an interference module to identify a radio frequency interference (RFI) impact on the radio based on the plurality of signal strength values.

Embodiments of the present invention also provide for a computer readable medium having a set of stored instructions which, if executed, cause an apparatus to receive a plurality of signal strength values of a radio, and identify an RFI impact on the radio based on the plurality of signal strength values.

Embodiments of the present invention also provide for a system having a first radio, a second radio and a host processor. The host processor may receive a plurality of signal strength values from the first radio, identify an RFI impact on the first radio based on the plurality of signal strength values, and adjust a real-time operational value associated with the second radio based on the RFI impact. A platform management engine may adjust a real-time operational value of one or more of the other radios based on the identified interference impact. In one example, the platform management engine might identify and adaptively shift an interfering computing clock either out of the on-channels or to a neutral position within the on-channels in order to negate the harmful effects of the clock.

Figure 1:
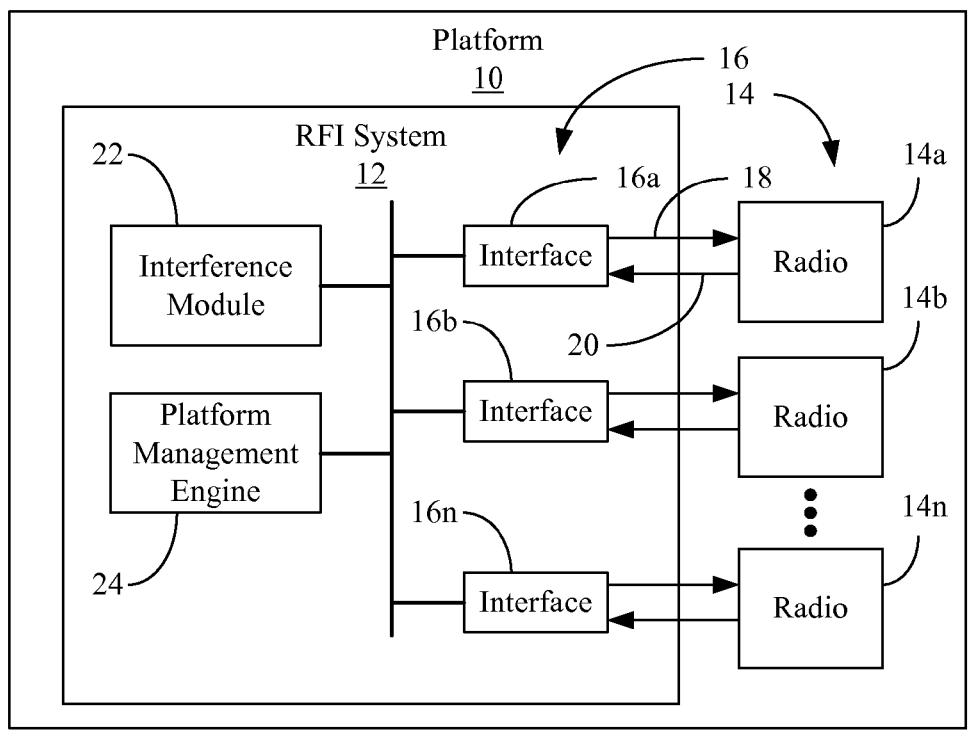
FIG. 1 is a block diagram of an example of a platform according to an embodiment of the present invention.

FIG. 1 shows a platform 10 having an RFI system 12 and a plurality of radios 14 (14a-14n). The platform 10 could be a mobile platform such as a laptop, personal digital assistant (PDA), wireless smart phone, media player, imaging device, etc., or any combination thereof. The platform 10 may also be a fixed platform such as a personal computer (PC), server, workstation, etc. The radios 14 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. Accordingly, each radio 14 may be susceptible to RFI from any of the other radios 14, from other interference sources on the platform 10, or from other interference sources external to the platform 10.

In the illustrated example, the RFI system 12 has an interface 16 (16a-16n) to each of the radios 14, wherein each interface 16 is able to issue interference calls to its respective radio and receive a plurality of signal strength values from the radio in response to the interference calls. For example, the interface 16a may be an application programming interface (API) that issues an interference call 18 such as a dynamic linked library (DLL) call to the radio 14a, receives a corresponding signal strength value 20 in response to the call, and repeats the iterative process to obtain a plurality of signal strength values. The interface 16a could alternatively exchange the interference calls and signal strength values with a device other than the radio 14a such as another radio (not shown) that is controlled by the radio 14a as a slave device and is dedicated to issuing signal strength values. The type of signal strength value may vary based on the type of radio 14. For example, the signal strength value could be a unitless received signal strength indicator (RSSI) value as used in the IEEE 802.11 protocol family, or a signal to noise ratio (SNR) as used in other communication systems.

The illustrated RFI system 12 also includes an interference module 22, which can identify an RFI impact on the radio in question based on the plurality of signal strength values obtained from that radio. As will be discussed in greater detail below, one approach to identifying the RFI impact is to identify maximum and minimum values in the plurality of signal strength values, and draw certain inferences with regard to traffic signal strengths and interference signal strengths. A platform management engine 24 may adjust a real-time operational value of one or more of the other radios 14 based on the identified interference impact. In one example, the platform management engine 24 might identify and adaptively shift an interfering computing clock either out of the on-channels or to a neutral position within the on-channels in order to negate the harmful effects of the clock. Thus, the illustrated platform 10 does not require "quiet time" in order to assess RFI conditions, and can even identify noise during radio receive operations from radios that can only provide RSSI or SNR information. As a result, wireless performance can be maximized at minimal cost through reuse of existing radio hardware components.

Figure 2:
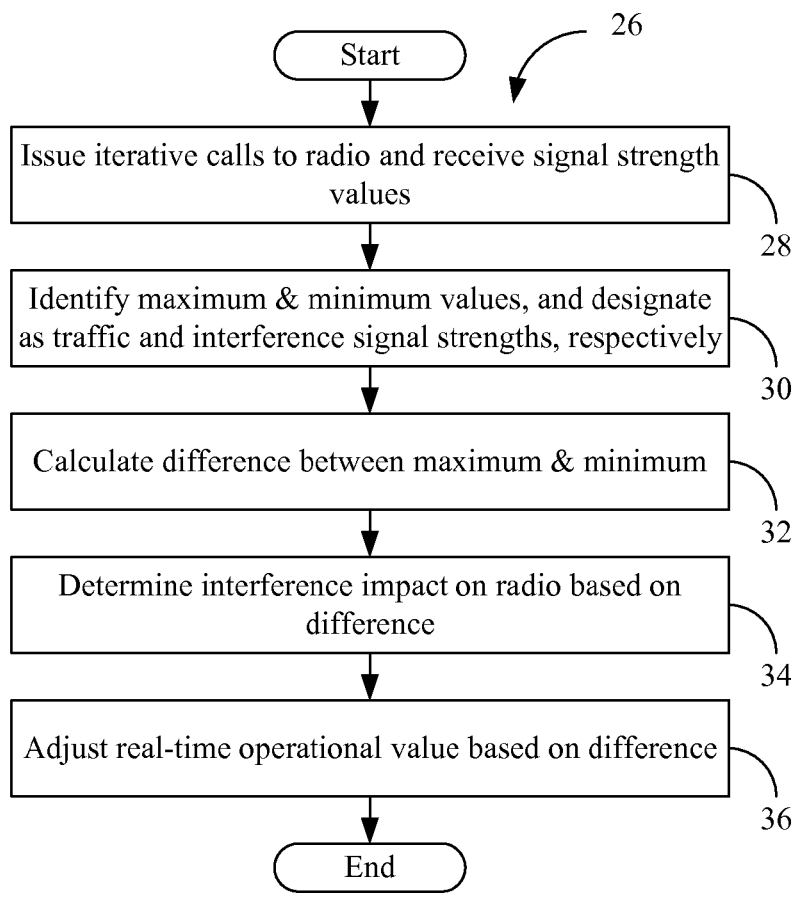
FIG. 2 is a flowchart of an example of a method of mitigating RFI according to an embodiment of the present invention.

Turning now to FIG. 2, a method 26 of mitigating RFI is shown. The method 26 may be implemented in executable software as a set of logic instructions stored in a machine- or computer-readable medium of a memory such as random access memory (RAM), read only memory (ROM), programmable ROM (PROM), flash memory, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in method 26 may be written in any combination of one or more programming languages, including an object oriented programming language such as Java, Smalltalk, C++ or the like and conventional procedural programming languages, such as the "C" programming language or similar programming languages.

With continuing reference to FIGS. 2 and 3, illustrated processing block 28 provides for issuing iterative calls to a radio and receiving a plurality of signal strength values 20 (20*a-e*) in response to the calls. Maximum and minimum values can be identified at block 30, wherein a maximum value 20*b* may be designated as the traffic signal strength and a minimum value 20*e* may be designated as the interference signal strength. Illustrated block 32 provides for calculating the difference between the minimum value 20*e* and the maximum value 20*b*. Such a calculation can provide a relative assessment between the traffic signal strength and the interference signal strength, where a larger difference represents a minimal RFI impact and a smaller difference represents a more significant RFI impact. In this regard, the signal strength values 20 may be unitless values that provide an opportunity for fast, relative determinations, rather than absolute determinations that may require more processing overhead and/or more time to reach a conclusion. In addition, the maximum and minimum values could be identified on a "max-hold", "min-hold" running basis, wherein as each signal strength value is received, a determination is made as to whether it represents a minimum or a maximum value.

The RFI impact on the radio in question may be determined at block 34 and a real-time operational value may be adjusted based on the RFI impact at block 36. As already noted, the adjustment operation at block 36 might include a clock shift or other type of operation in order to increase the difference between the minimum and maximum values.

Thus, using minimum-hold and maximum-hold operations, the illustrated approach can exploit the discontinuous and random nature of real-time wireless traffic during receive operations and the steady state nature of the platform RFI, to distinguish RFI from received traffic. As a result, the illustrated approach can detect real-time environmental or internal platform RFI from radios that provide limited information. In addition, in-band spurious emissions originating from the platform itself or its surroundings need not be left for aftermarket wireless performance adjustments/optimizations. Moreover, the illustrated approach may provide for minimizing returns of material (platforms), maximizing wireless platform performance, and reducing the occurrence of high platform noise interference profiles. The illustrated approach may also represent a hybrid between traditional closed-loop solutions that are dynamic and can be computationally intensive and difficult to implement, and conventional open-loop solutions that are static and may fail to predict the real-time impact of RFI.

FIG. 4 shows a system 38 that may be a portion of a computing platform such as a laptop, personal digital assistant (PDA), wireless smart phone, media player, or imaging device. The illustrated system includes one or more processors 40, graphics/memory/input/output (GMIO) control 42, memory 44, a first radio 46, a second radio 48, and user interface devices 50. The illustrated processor(s) 40 function as a host processor that includes an RFI system 52 such as the RFI system 12 (FIG. 1), wherein the radios 46, 48 may each have a wireless interface based on the communication protocol employed in the radios 46, 48. Thus, the RFI system 52 may collect signal strength values from the radios 46, 48, and implement various RFI mitigation tactics based on the collected signal strength values. Alternatively, the RFI system 52 could be implemented in a central processor, graphics processing unit or other generic processing unit, or even within one or more of the radios 46, 48 themselves. The processor(s) 40 may be coupled to the memory 44, radios 46, 48, and user interface devices 50 through the GMIO control 42. The GMIO control 42 may include one or more blocks (e.g., chips or units within an integrated circuit) to perform various interface control functions (e.g., memory control, graphics control, I/O interface control, and the like). These circuits may be implemented on one or more separate chips and/or may be partially or wholly implemented within the processor(s) 40.

The memory 44 can include one or more memory blocks to provide additional RAM to the processor(s) 40. It may be implemented with any suitable memory including but not limited to dynamic RAM (DRAM), static RAM (SRAM), flash memory, or the like. The radios 46, 48 may wirelessly couple the processor(s) 40 to a wireless network (not shown). The radios 46, 48 may also include portions of the RFI system 52, as appropriate. The user interface devices 50 may include one or more devices such as a display, keypad, mouse, etc. to allow a user to interact with and perceive information from the system 38.

As already noted, the system 38 may implement a variety of different computing devices or other appliances with computing capability. Such devices include but are not limited to laptop computers, notebook computers, PDAs, cellular phones, audio and/or video media players, desktop computer, servers, and the like. The system 38 could constitute one or more complete computing systems or alternatively, it could constitute one or more components useful within a computing system.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
   a radio interface to receive a plurality of signal strength values of a radio; and
   an interference module to determine a radio frequency interference impact on the radio based on the plurality of signal strength values, wherein the interference module is to identify a minimum value in the plurality of signal strength values and designate the minimum value as an interference signal strength.

2. The apparatus of claim 1, wherein the interference module is to identify a maximum value in the plurality of signal strength values and designate the maximum value as a traffic signal strength.

3. The apparatus of claim 2, wherein the interference module is to calculate a difference between the minimum value and the maximum value, and determine the interference impact based on the difference.

4. The apparatus of claim 1, further including a platform management engine to adjust a real-time operational value based on the interference impact.

5. The apparatus of claim 1, wherein the radio interface is to issue a plurality of interference calls to the radio, and each of the plurality of signal strength values is to correspond to one of the plurality of interference calls.

6. The apparatus of claim 1, wherein the plurality of signal strength values is to include one or more received signal strength indicator (RSSI) values.

7. The apparatus of claim 1, wherein the plurality of signal strength values is to include one or more signal to noise ratio (SNR) values.

8. A computer readable medium comprising a set of stored instructions which, if executed, cause an apparatus to:
   receive a plurality of signal strength values of a radio; and
   determine a radio frequency interference impact on the radio based on the plurality of signal strength values;
   identify a minimum value in the plurality of signal strength values; and
   designate the minimum value as an interference signal strength.

9. The computer readable medium of claim 8, wherein the instructions, if executed, further cause an apparatus to:
   identify a maximum value in the plurality of signal strength values; and
   designate the maximum value as a traffic signal strength.

10. The computer readable medium of claim 9, wherein the instructions, if executed, further cause an apparatus to:
    calculate a difference between the minimum value and the maximum value; and
    determine the interference impact based on the difference.

11. The computer readable medium of claim 8, wherein the instructions, if executed, further cause an apparatus to adjust a real-time operational value based on the interference impact.

12. The computer readable medium of claim 8, wherein the instructions, if executed, further cause an apparatus to issue a plurality of interference calls to the radio, where each of the plurality of signal strength values is to correspond to one of the plurality of interference calls.

13. The computer readable medium of claim 8, wherein the plurality of signal strength values is to include one or more received signal strength indicator (RSSI) values.

14. The computer readable medium of claim 8, wherein the plurality of signal strength values is to include one or more signal to noise ratio (SNR) values.

15. A system comprising:
    a first radio;
    a second radio;
    a host processor to receive a plurality of signal strength values of the first radio, determine a radio frequency interference impact on the first radio based on the plurality of signal strength values, and adjust a real-time operational value associated with the second radio based on the interference impact; and
    a third radio to send the plurality of signal strength values to the host processor.

16. The system of claim 15, wherein the host processor is to further:
    identify a minimum value in the plurality of signal strength values;
    designate the minimum value as an interference signal strength;
    identify a maximum value in the plurality of signal strength values;
    designate the maximum value as a traffic signal strength;
    calculate a difference between the minimum value and the maximum value; and
    determine the interference impact based on the difference.

17. The system of claim 15, wherein the plurality of signal strength values is to include at least one of a received signal strength indicator (RSSI) value and a signal to noise ratio (SNR) value.

* * * * *